United States Patent [19]  
Hirai et al.

[11] 3,971,746  
[45] July 27, 1976

[54] SYNTHETIC POLYISOPRENE RUBBER LATEX

[75] Inventors: Koji Hirai; Takayuki Okamura; Kiyoshi Fujii, all of Kurashiki, Japan

[73] Assignee: Kuraray Co., Ltd., Kurashiki, Japan

[22] Filed: Mar. 28, 1975

[21] Appl. No.: 562,876

[30] Foreign Application Priority Data  
Mar. 29, 1974 Japan............................. 49-36145  
Nov. 29, 1974 Japan........................... 49-137878

[52] U.S. Cl................. 260/29.7 D; 260/29.7 SQ; 260/29.7 H; 260/29.7 AT
[51] Int. Cl.$^2$................................. C08L 9/10
[58] Field of Search................ 260/23.7 A, 29.7 D, 260/29.7 H, 29.7 AT

[56] References Cited  
UNITED STATES PATENTS

| | | | |
|---|---|---|---|
| 2,662,874 | 12/1953 | Brown | 260/82.1 |
| 2,871,137 | 1/1959 | Aldridge et al. | 260/29.7 H |
| 3,215,649 | 11/1965 | Preiss et al. | 260/23.7 A |
| 3,258,440 | 6/1966 | Burleigh et al. | 260/23.7 A |
| 3,285,869 | 11/1966 | Ronay et al. | 260/23.7 A |
| 3,527,736 | 9/1970 | Averink et al. | 260/78.4 |
| 3,567,691 | 3/1971 | van Breen et al. | 260/78.4 |
| 3,598,793 | 8/1971 | Koch | 260/79.5 B |
| 3,644,248 | 2/1972 | Luijk et al. | 260/23.7 M |
| 3,654,203 | 4/1972 | Daimer et al. | 260/29.7 H |
| 3,778,418 | 12/1973 | Nakayama et al. | 260/78.4 D |
| 3,789,046 | 1/1974 | Heidel | 260/23.7 A |
| 3,817,899 | 6/1974 | Turk | 260/29.7 SQ |
| 3,887,527 | 6/1975 | Okamura et al. | 260/879 |

*Primary Examiner*—M. J. Welsh  
*Attorney, Agent, or Firm*—Bacon & Thomas

[57] ABSTRACT

A synthetic polyisoprene rubber latex produced by emulsifying a solution of polyisoprene rubber in an organic solvent with water and removing the solvent from the resulting oil-in-water emulsion is significantly improved with respect to mechanical stability, wet gel strength and dry film strength by utilizing, as a polyisoprene rubber, a modified polyisoprene rubber prepared by introducing from about 0.03 to 20 carboxyl groups per 100 recurring units of isoprene monomer present in the synthetic cis-1,4-polyisoprene rubber.

27 Claims, No Drawings

SYNTHETIC POLYISOPRENE RUBBER LATEX

BACKGROUND OF THE INVENTION

1. Field of the Invention

This invention relates to a latex based on synthetic cis-1,4-polyisoprene rubber (hereinafter abbreviated as IR). More particularly, the invention relates to an IR-type latex which displays substantially improved wet gel strength and dry film strength and which has excellent stability and processability.

2. Description of the Prior Art

It is well known in the art that an IR latex is obtained when an IR solution prepared by solution polymerization of isoprene in the presence of a Ziegler-type catalyst or a lithium-type catalyst is first emulsified and dispersed in water with the aid of an emulsifying agent and the solvent is then removed, with or without subsequent concentration of the resultant dilute latex. See, for example, U.S. Pat. No. 3,285,869. However, the production of IR latex by methods such as the foregoing is disadvantageous from the standpoint that large amounts of polymeric coagulate tends to precipitate in the course of stripping, i.e., removal of the solvent, or in the concentration step where the dilute latex is concentrated, for example, by centrifugation. As a consequence, such an IR latex is seriously deficient in mechanical and thermal stability. The inadequate mechanical and thermal stability of IR latex is not only responsible for the difficulties experienced in the production of latex but also is a primary cause of the diverse problems encountered when the latex is subsequently processed into shaped rubber articles. For example, coagulation of the latex takes place upon the addition of a vulcanizing agent and other compounding agents under agitation as well as during the transportation of the latex.

Although the use of an emulsifying agent in substantial amounts improves the stability of a latex, it considerably detracts from the physical properties of the latex, including its wet gel strength, film-forming property and dry film strength thereof.

Irrespective of whether a substantial amount of emulsifying agent is employed or not, IR latex is inherently inferior to natural latex in wet gel strength and dry film strength. Wet gel strength is generally defined as the strength of a latex measured during coagulation, i.e., the strength of the film at the wet gelation point. Dry film strength, on the other hand, is defined as the strength of a film in which the coagulation of the latex is complete and which contains no liquid medium. Reduced levels of wet gel strength and dry film strength of a latex lead to irreversible deficiencies in the various rubber articles manufactured from the latex. For example, in the manufacture of rubber articles, such as gloves and medical and hygienic goods by a dipping process, streaks and grooves are formed on the surface of the film coated on the convex mold, and deformation of the film occurs when it is removed from the mold. Such problems as mentioned hereinabove often occur in the course of processing shaped articles resulting in unsatisfactory products. Furthermore, in the production of foamed rubber from such a latex, additional defects will be encountered, such as middle tear, which is attributable to inadequate wet gel strength of the latex.

As previously mentioned, IR latex has serious inherent disadvantages, i.e., deficiencies in mechanical stability which is an important factor in the preparation and molding of latex and in wet gel strength an dry film strength, both of which are important determinants of the properties of shaped articles derived from the latex and the present invention is directed to improving IR latex.

SUMMARY OF THE INVENTION

It is, therefore, an object of the present invention to provide a novel synthetic cis-1,4-polyisoprene-type rubber latex which is not attended by the aforementioned disadvantages.

Another object is to provide a synthetic cis-1,4-polyisoprene-type rubber latex which has a high degree of mechanical stability and which displays improved wet gel strength and dry film strength comparable to those of natural rubber latex.

In accordance with the present invention, the aforementioned objects are accomplished by providing a synthetic rubber latex derived from a synthetic polyisoprene rubber obtained by emulsifying a solution of polyisoprene rubber in an organic solvent with water and removing the solvent from the resultant oil-in-water emulsion, the synthetic rubber latex being characterized in that said polyisoprene rubber is a modified polyisoprene rubber prepared by introducing carboxyl groups into synthetic cis-1,4-polyisoprene rubber in an amount such that the modified polyisoprene rubber contains 0.03 to 20 carboxyl groups per 100 recurring units of isoprene monomer present in said polyisoprene rubber (which modified rubber will hereinafter be sometimes referred to as modified IR).

DETAILED DESCRIPTION OF THE INVENTION

The modified IR according to the invention may be prepared by any desired procedure provided that carboxy groups are thereby introduced into a previously prepared synthetic cis-1,4-polyisoprene.

The general process and catalyst parameters for the polymerization of isoprene in an aliphatic or alicyclic hydrocarbon solvent medium are well known in the art. The catalysts for the production of high cis-1,4-polyisoprene may be classified as Ziegler-type catalysts and anionic catalysts. Ziegler-type catalysts are preferably prepared from an organoaluminum compound and a titanium tetrahalide, and the polymerization reaction is usually carried out by contacting the isoprene with said catalyst, in the hydrocarbon solvent medium, at a temperature ranging from between about 0°C. to 150°C. Examples of such organoaluminum compounds include trimethyl aluminum, triethyl aluminum, triisobutyl aluminum, tri-n-butyl aluminum, tri-n-pentyl aluminum, triisooctyl aluminum and tricyclohexyl aluminum. Respecting the titanium tetrahalide, titanium tetrachloride is the preferred. Typical anionic catalysts for the production of IR comprise the lithium-based catalysts which contan lithium and/or lithium compounds. Among the more well known lithium-based catalysts, there are mentioned lithium metal, lithium hydrocarbyls and organolithium amides. Among the more preferred catalyst species, there are mentioned alkyl lithium compounds such as n-butyl lithium sec.-butyl lithium, amyl lithium and isobutyl lithium. However, any Ziegler-type catalyst or anionic catalyst known to be useful for the solution polymerization of isoprene can be utilized according to this invention, and it is not intended that the subject process be limited in any way by reason of any catalyst parameter.

The aforementioned carboxyl group may take the form of an alkali metal salt such as, for example, lithium, sodium or potassium salt. In the carboxylation, IR may be carboxylated prior to the preparation of latex or in the course of the preparation thereof. Therefore, the carboxylating agent utilized need not necessarily have a free carboxyl group as such but only need to have a group which is convertible to a carboxyl group (including a salt thereof) upon hydrolysis or other subsequent treatment after reaction with IR. For convenience, IR which has been reacted with such a convertible carboxylating agent will hereinafter likewise be referred to briefly as modified IR. The methods of introducing carboxyl groups into IR and the carboxylating agents used therefor are known per se (for example, U.S. Pat. No. 2,662,874). A first category of carboxylating agents includes unsaturated mono- or polycarboxylic acids and their esters and may be represented by the following general formula:

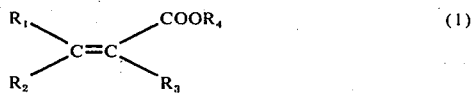

(1)

wherein $R_1$ and $R_2$ are the same or different and selected from the group consisting of H, $CH_3$, $C_2H_5$, $COOR_5$, $CH_2COOR_5$, CN, Cl and $CONH_2$; $R_3$ is H, $CH_3$, $C_2H_5$, $COOR_5$ or $CH_2COOR_5$; $R_4$ is H, $CH_3$, $C_2H_5$ or $C_3H_7$; and $R_5$ is H, $CH_3$, $C_2H_5$, $C_3H_7$, $C_4H_9$ or $C_6H_5$. Thus, for example, acrylic acid, methacrylic acid, crotonic acid, maleic acid, tiglic acid, monomethyl maleate, dimethyl maleate, fumaric acid, monomethyl fumarate, dimethyl fumarate, itaconic acid, monomethyl itaconate, mesaconic acid, citraconic acid and maleic acid monoamide may be utilized in accordance with the present invention. A second category of carboxylating agents includes anhydrides of α,β-unsaturated dicarboxylic aicds and anhydrides of α,β-unsaturated dicarboxylic acid monoamides, which may be represented by the following general formulas:

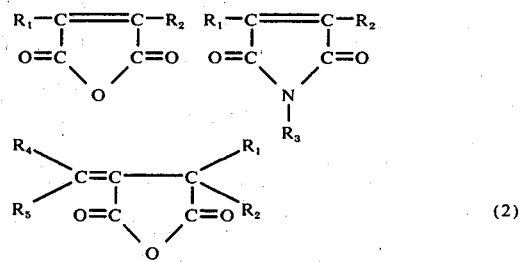

(2)

wherein $R_1$ and $R_2$ are the same or different and selected from the group consisting of H, $CH_3$, $C_2H_5$, Cl and CN; $R_3$ is H, $CH_3$, $CONH_2$ or $C_6H_5$; $R_4$ and $R_5$ are the same or different and selected from the group consisting of H, $CH_3$ and $C_2H_5$. Thus, maleic anhydride, itaconic anhydride, citraconic anhydride, maleimide and N-methylmaleimide may be metnioned as exemplary carboxylating agents in this category. A third category includes α,β-unsaturated acid chlorides which are represented by the following general formula:

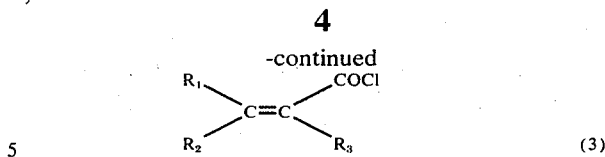

(3)

wherein $R_1$ and $R_2$ are the same or different and selected from the group consisting of H, $CH_3$, $C_2H_5$, $COOR_4$, $CH_2COOR_4$, CN, Cl, $CONH_2$ and COCl; $R_3$ is H, $CH_3$, $C_2H_5$ or $COOR_4$; $R_4$ is H, $CH_3$, $C_2H_5$, $C_3H_7$ or $C_6H_5$. Accordingly, acrylic acid chloride, methacrylic acid chloride, maleic acid dichloride, itaconic acid chloride, crotonic acid chloride, etc. may be mentioned by way of example. A fourth category includes carboxyl-containing allylic compounds such as allylsuccinic acid, allylsuccinic anhydride and the like. A fifth category includes the compounds which, unlike the compounds thus far mentioned, contain no unsaturated double bond but are capable of undergoing addition reactions with IR and, accordingly, capable of introducing a carboxyl group or carboxyl groups into IR. Thus, thioglycollic acid, thioglycollic acid esters, azodicarboxylic acid, azodicarboxylic acid esters, etc. may be mentioned. The aforementioned carboxylating agents may be used alone or in combination, or in admixture with vinyl monomers such as styrene, acrylamide, methyl methacrylate and the like.

In the practice of this invention, maleic acid compounds are most advantageously employed as the carboxylating agents. The term "Maleic acid compounds" as used herein is intended to include not only maleic acid in the strict meaning of the term but also includes maleic acid derivatives such as maleic anhydride, maleic acid mono- or dialkyl esters, the alkyl ester residues of which contain 1 to 4 carbon atoms, mono- or dialkyl anhydrides, the alkyl moieties of which contain 1 to 4 carbon atoms, maleimide, maleimide substituted with alkyl groups of 1 to 4 carbon atoms and similar compounds.

The production of modified IR by the reaction of IR with a carboxylating agent will be described briefly below, although the process for the production of modified IR as such does not form any part of this invention. A typical process comprises adding a carboxylating agent to a solution of IR and heating the mixture at a temperature of 50° to 250°C. in an inert gaseous atmosphere. As the solvent for IR, any of the following may be utilized: aliphatic and alicyclic hydrocarbons, e.g., n-butane, isobutane, isopentane, n-hexane, isooctane, cyclohexane, methyl cyclohexane, etc; and aromatic hydrocarbons, e.g., benzene, toluene, xylene, ethyl benzene, etc. The preferred aliphatic and alicyclic hydrocarbon solvents are those having 4 to 10 carbon atoms and the preferred aromatic hydrocarbons have 6 to 12 carbon atoms. If necessary, in carrying out the reaction in solution, use may be made of a radical initiator (a catalyst that liberates free radicals) such as, for example, benzoyl peroxide, azobisisobutyronitrile, diisopropylbenzene hydroperoxide, di-t-butyl peroxide, cumene hydroperoxide, dicumyl peroxide or the like. An alternative method comprises contacting solid IR with a carboxylating agent during the mastication of the IR by means of rolls or a mixer such as a Banbury mixer. In this method, a radical initiator may likewise be employed. The cis-1,4 content of the starting IR is generally not less than 80 percent and, for best results, not less than 95 percent. In addition, the starting IR preferably has a high molecular weight corresponding to an intrinsic viscosity of not less than 3.0 dl/g as measured in toluene at 25°C. In accordance with the instant invention, the carboxyl content of the modified IR is desirably within the range of 0.03 to 20 and, preferably, from 0.05 to 2 in terms of the number of carboxyl groups per 100 recurring units of isoprene monomer of the IR. A carboxyl content below the above range does not provide appreciable improvements in mechanical stability, wet gel strength and dry film strength, while a carboxyl content in excess of the above range results in an excessive increase in viscosity of the latex and in ultimate vulcanized rubber products which are excessively hard. The term "carboxyl content" of modified IR as used throughout this specification means the number of carboxyl groups in said rubber as dispersed in the form of fine particles in the resultant latex. The carboxyl content is determined by the following procedure: the modified IR separated by coagulation of the latex is dissolved in benzene and the carboxyl groups are titrated with a solution of sodium hydroxide in methanolbenzene (1:4 by volume) using bromothymol blue or phenolphthalein as an indicator. The free carboxyl groups and the carboxyl groups in the form of salts are thereby quantitatively determined. The carboxyl content of modified IR can be controlled by varying the reaction conditions such as the amount of carboxylating agent to be reacted with IR, the amount of radical initiator and the reaction temperature.

The solution of the modified IR to be used in the emulsification procedure may, when the reaction of IR and carboxylating agent has been conducted in solution be the reaction mixture as such. The reaction mixture is preferably washed with water prior to emulsification in order to remove any unreacted carboxylating agent. When the modified IR is obtained by the reaction of solid IR and carboxylating agent, as well as when it is desired to transfer the modified IR in the solution-reaction mixture into a separate solvent, a solvent is used to prepare the aforementioned modified IR solution to be employed in the preparation of the latex. The foregoing solvent may be any solvent that is capable of dissolving IR, and the solvent used for reacting IR with the carboxylating agent in solution can be advantageously employed. The aforementioned solvent may additionally contain a small proportion of a nonsolvent or nonsolvents for IR or modified IR such as methanol, ethanol and the like. The usual concentration of modified IR in the solution is 4 to 20 percent by weight and, preferably, 5 to 15 percent by weight. In accordance with the invention, the best results are obtained utilizing a solution of modified IR containing bound maleic anhydride in a proportion of 0.03 to 2 carboxyl groups per 100 recurring units of isoprene monomer. Such a modified IR is obtainable by reacting maleic anhydride with IR in solution as described hereinabove.

As for the emulsifying agent to be employed in the emulsification of said modified IR solution, anionic surface active agents which are commonly employed in emulsion-polymerization reactions, such as, for example, potassium oleate, potassium salt of rosin acid, potassium abietate, ammonium oleate, etc., provide satisfactory results. Other anionic surfactants such as, for example, the potassium or sodium salts of palmitic acid, stearic acid, lauric acid, myristic acid, etc., and the potassium or sodium salt of alkylbenzenesulfonic acids may also be employed. The anionic surfactants may be used in combination with nonionic surfactants. In order to attain the desired physical properties of the product latex, the amount of emulsifying agent is desirably 2 to 20 parts by weight and, preferably for best results, 5 to 12 parts by weight per 100 parts by weight of the modified IR. The emulsification is generally accomplished by agitating the modified IR solution together with water containing said emulsifying agent and, since the resultant emulsion and the latex therefrom are stable under alkaline conditions between pH 8 and pH 13.5, there may be previously added to the water-emulsifying agent mixture a pH regulator such as sodium hydroxide, potassium hydroxide or the like. The volume ratio of modified IR solution to water in the emulsification is generally within the range of 3:1 to 1:10, although water may be present in slightly greater proportions. In order to promote the stability of the resultant latex and from economic considerations, emulsification is desirably accomplished in a modified IR solution-to-water ratio of 3:1 to 2:1.5. The emulsification is effectuated by means of a conventional mixing device such as a Eppenbach homomixer, colloid mill, homogenizer, Disper mill, line mixer or ultrasonic emulsification device. The particle size of modified IR as dispersed in the resultant latex is dictated by the conditions of emulsification such as the amount of emulsifying agent and water, as well as the intensity of agitation.

The method for removing the solvent from the resultant oil-in-water emulsion may be any of the methods commonly utilized in the prior art and, particularly, steam distillation, distillation under reduced pressure, steam distillation under reduced pressure etc. are acceptable. If necessary, the dilute latex thus obtained may be concentrated (by partial removal of water) by any conventional procedure such as, for example, centrifugation, creaming and evaporation under heat. The resultant latex is processed into shaped products when the total solids content of the latex reaches the range of 0.1 to 70 weight percent.

When the carboxylating agent to be reacted with IR contains a group convertible, by hydrolysis, for instance, to a free carboxyl group (or a salt thereof) such as, for example, an acid anhydride group or ester group, the aforementioned emulsification step and/or solvent stripping step yields a modified IR having free carboxyl groups or a salt thereof. It is not essential in the practice of the present invention that all of the rubber component in the latex be a carboxyl-containing modified IR. Most generally, a mxiture of modified IR and ordinary (unmodified) IR is used for the production of latex. In this connection, the factors mentioned hereinbefore as necessary for the attainment of an improved latex, as well as those which will be mentioned hereinafter, such as the carboxyl content and gel content of the modified IR, particle size of latex, etc., are all relevant and pertinent with respect to the aforementioned mixture as well. It follows, therefore, that modified IR in the context of this invention includes modified IR as such and mixtures of modified IR with ordinary IR. The unmodified IR in said mixtures may account for as much as 80 percent by weight.

The latex thus produced evidences markedly improved mechanical stability, wet gel strength and dry film strength over conventional IR latex. However, when the modified IR utilized has a relatively high gel content, the stability of the latex may be adversely affected. The presence of gel in modified IR is desirable in that the latex will show high wet gel strength and dry film strength but is undesirable from the standpoint of mechanical stability. The gel content of IR is generally increased by the introduction of carboxyl groups into the IR chain. Therefore, as far as commercial production is concerned, it is desirable to provide a latex which permits the presence of a relatively large amount of gel in the modified IR and, at the same time, maintaining improved mechanical stability.

It has been found according to the invention that the aforementioned problem can be obviated by preselecting a suitable balance between the gel content of the modified IR and the particle size of the latex. Specifically, the aforementioned modified IR latex will display excellent mechanical stability if the average diameter of the particles in the latex is about 0.2 to $5\mu$ and the gel content of the modified IR in the particle is at lest 5 weight percent based on the weight of the rubber and not higher than the value calculated by the following formula: $100-2.17$ (average diameter of the particles $-0.2)^2$. For example, when the average particle diameter of the latex is approximately $0.2\mu$, the rubber component in the particle may contain gel (toluene insoluble portion) in an amount over the range up to about 100 weight percent and the latex will remain highly stable. When the average diameter of latex particles is $5\mu$, the rubber in the particles may contain about 50 weight percent of the toluene insoluble portion according to the formula: $100-2.17(5-0.2)^2$.

It will be apparent from the foregoing description that by controlling the gel content of the rubber in the particles according to the particle size of the rubber in the latex or, conversely, by controlling the particle size of latex according to the gel content of the rubber in the latex particles, the high stability of the latex can be ensured even though the gel content is as high as 100 percent or the particle size of the rubber in the latex is as large as $5\mu$.

Throughout this specification and the claims appended thereto, the terms "gel" or "toluene-insoluble portion" are defined as the sediment in toluene which is obtained by pouring the latex into a large excess of methanol for coagulation, adding 1 g. of the rubber in the resultant coagulated latex particles to 100 cc. of toluene, and then subjecting the thus formed mixture to centrifugation at 7000 G (G: gravitational constant) at a temperature of 25°C. for 30 minutes. The sediment is weighed and expressed in weight percent relative to the weight of rubber in the above mixture.

In the latex according to the invention, if the content of toluene-insoluble portion is less than 5 weight percent, the wet gel strength and dry film strength of the latex will not be commercially acceptable. A latex having a content of toluene-insoluble portion of not less than 15 weight percent has been found to be particularly satisfactory. The stability of the latex is lessened when the modified IR has a toluene insoluble (gel) content over the value given by the above formula taking into account the particle size of the latex. The reduced gel content of the modified IR makes it feasible to prepare a latex with an advantageously large particle size. Modified IR of low gel content can be obtained, for example, by the method wherein IR is reacted with a carboxylating agent in solution and a small proportion of isoprene monomer or water is added or by the method in which an aromatic hydrocarbon is used as the reaction medium. If a latex is mechanically stable and its particle size is large, then the amount of emulsifying agent required for the dispersion of rubber can be curtailed substantially and, accordingly, the physical properties of the resultant latex can be improved. Furthermore, a large particle size permits an increased latex concentration, reduced viscosity of the latex and an improvement in the efficiency of concentrating the latex. On the other hand, when extremely high strength characteristics of the latex are required for certain applications, a latex of relatively small particle size based on a modified IR having a high gel content is ideally suitable for such applications.

The latex according to this invention is desirably such that the diameter of modified IR particles dispersed therein falls within the range of 0.2 to $5\mu$ and, most preferably, within the range of 0.7 to $4\mu$. When the particle diameter is in excess of $5\mu$, it has been determined that it is difficult to maintain the stability of the latex even if the gel content of modified IR is extremely low. The employment of modified IR having a particle size less than $0.2\mu$ is not a desideratum in the present invention insofar as highly improved wet gel strength and dry film strength, and excellent mechanical and thermal stability of the latex are concerned, although it might otherwise be useful for ordinary IR latex or other types of latex.

According to the present invention, there can be obtained a latex having excellent stability even when the modified IR has a gel content greater than 60 weight percent or even in excess of 70 weight percent. It should be particularly emphasized that this is possible only when the relationship between the average diameter of rubber particles dispersed in the latex and the content of toluene insoluble portion of rubber in said particles is as defined hereinabove and that the procedures previously detailed for preparing the modified IR, emulsion and/or latex are not particularly critical in this context.

The improved strength characteristics and excellent stability of the latex according to the invention will be better understood from the working examples described hereinafter. However, it should be noted generally that the wet gel strength and dry film strength of the latex according to the invention are comparable to, or greater than, the corresponding strength values obtained with natural latex and that the latex of the invention displays excellent stability during concentration and in other process parameters including the fact that the addition of various conventional compounding ingredients, e.g., sulfur, accelerators, zinc oxide, etc. do not detract from the stability of the latex or resultant articles. Therefore, the latex of the invention can be readily processed into the dip-formed articles such as rubber gloves, medical and hygienic products, etc., in which processes unmodified IR latices such as Cariflex IR-700 (registered trademark of Shell Oil Company) have proved difficult. In practice, then, the latex of this invention may be advantageously blended with other latices such as natural latex, ordinary IR latex, styrene-butadiene copolymer latex, acrylonitrile-butadiene copolymer latex, polybutadiene latex and chloroprene latex to improve the resultant characteristics of such other latices. The proportion of the latex of the present invention to the other latices varies depending upon the solid contents, but may be as low as 10/90, preferably more than 50/50 by weight.

In the examples described hereinafter, the terms listed below have the following defined meansings:

1. PHR: parts by weight per 100 parts by weight of IR.

2. Carboxyl content of modified IR: as defined hereinabove.
3. Mechanical stability: The amount of the coagulate formed on centrifugation of the latex is expressed in weight percentage based on the total weight of solids. A Maron-type mechanical stability tester is used. Conditions of measurement: Load 10 kg.; time 10 minutes; the value obtained is inversely proportional to the stability of the latex, i.e., low value indicates high stability.
4. Tensile strength of wet gel: The latex is coated onto a support plate, which is then immersed in a 30% methanolic solution of calcium nitrate at 20°C. for 3 minutes. The obtained coagulated latex is allowed to dry at a relative humidity of 60% and a temperature of 20°C. for 30 minutes. Thereafter, the strength of the sample is measured at a cross-head speed of 5 cm/min. at 25°C.
5. Tensile strength of dry film or dry gel: Cross-head speed 5 cm/min.

560 g. of a 1% aqueous solution of potassium oleate which had been adjusted to a pH of 11.5 with potassium hydroxide and the mixture was emulsified in a homomixer at 9000 r.p.m. for 5 minutes (the amount of emulsifier: 7 PHR). The solvent was removed from the resultant emulsion at 60°C. under reduced pressure to obtain a dilute latex. This dilute latex was then centrifuged at 25°C. and 7000 r.p.m., whereupon a concentrated latex with a solids content of 65% was obtained.

The results with respect to the properties of the above concentrated latex are shown in Table 1. For comparison, the properties of a concentrated latex derived from the abovementioned starting material IR (Control 1) and those of a natural rubber latex [solids content 62%, Harrison's latex (Control 2)], both prepared in the same manner as above, are also set forth in Table 1. It will be seen from the table that the modified IR latex according to the invention demonstrated markedly improved mechanical stability, wet gel strength and dry film strength.

TABLE 1

| | Reaction conditions | | Modified | | Physical Properties of Latex | | | |
| | | | | | Tensile strength | Tensile strength | | Number average |
| | MAn | BPO | IR COOH | Mechanical stability | of wet gel | of dry film | Toluene insolubles | particle size |
| Sample | (PHR) | (PHR) | content | (wt. %) | (kg/cm²) | (kg/cm²) | (wt. %) | (μ) |
|---|---|---|---|---|---|---|---|---|
| A | 0.04 | 0.004 | 0.02 | 80 | 0.7 | 1 | 32 | 0.8 |
| B | 0.75 | 0.035 | 0.1 | 0 | 4 | 8 | 49 | 0.8 |
| C | 1 | 0.05 | 0.2 | 0 | 6 | 10 | 80 | 0.9 |
| D | 3 | 0.05 | 0.35 | 0 | 10 | 17 | 87 | 0.6 |
| E | 9 | 0.08 | 0.8 | 0 | 17 | 32 | 95 | 0.3 |
| F | 12 | 0.1 | 1.25 | 4 | 24 | 50 | 98 | 2.8 |
| G | 20 | 0.7 | 3.1 | 15 | 36 | 72 | 100 | 4.0 |
| Control 1 | — | — | — | 80 | 0.4 | 0.5 | 5 | 0.8 |
| Control 2 | — | — | — | 90 | 11 | 19 | 55 | 0.19 |

6. Toluene insoluble content (Content of toluene insoluble portion): as defined hereinabove.
7. Number average particle diameter: The latex particles are fixed with osmic acid ($OsO_4$) and the diameters are measured by electronmicroscopy.

The following examples are merely illustrative of certain preferred embodiments of the invention and are not limitative with respect to the scope of the invention defined by the claims appended hereto:

EXAMPLE 1

Cis-1,4-polyisoprene with a cis-1,4 content of 98% and an intrinsic viscosity [ν] of 4.5 (dl/g) as measured in toluene at 30°C., which had been previously prepared by solution polymerization of isoprene in the presence of a Ziegler-type catalyst, was used as the starting IR.

In 7l. of toluene was dissolved 210 g. of the above IR and, then, maleic anhydride (abbreviated MAn) and benzoyl peroxide (abbreviated BPO) were added to the resultant solution at the levels indicated in Table 1 below. In a nitrogen atmosphere, the mixture was heated at 100°C. for 3 hours, with constant agitation. The reaction mixture was then poured into a large excess of acetone to precipitate the polymer, which was then dried to obtain a modified IR (in Table 1, samples A through G).

In 1l. of benzene was homogeneously dissolved 80 g. of the above modified IR. To this solution was added

EXAMPLE 2

To a solution prepared by dissolving 210 g. of the IR in Example 1 in 3l. of benzene, there was added benzoyl peroxide (BPO) and one of various unsaturated acid anhydrides in the amounts indicated in Table 2. After purging the air in the reaction vessel with nitrogen gas, each sample mixture was heated at 100°C. for 3 hours under agitation. The reaction mixture was washed with 5l. of water, followed by the addition of 1.0l. of a 1.5% aqueous solution of potassium oleate which had been previously adjusted to a pH of 10.0 with potassium hydroxide (amount of emulsifier: 7 PHR). The mixture was then emulsified in a homomixer at 9000 r.p.m. for 3 minutes. From the resultant emulsion, the benzene was removed by steam stripping to obtain a dilute latex. This latex was concentrated by centrifugation at 8000 r.p.m. to obtain a concentrated latex with a solids content of 64–66%.

The properties of the above-mentioned concentrated latex are shown in Table 2. The latex of the present invention (in Table 2, Samples A to D) not only evidenced markedly improved wet gel strength and dry film strength, but, notwithstanding its high toluene-insolubles content of 45 weight percent or up, had excellent stability. The samples represented by X in Table 2 are control samples. Thus, X-1 is a sample which does not satisfy the aforementioned requirements as to the relationship of latex particle size of number average and gel content; X-2 is a latex prepared by the above procedure from a solution of the starting IR in benzene, and X-3 is Cariflex IR-700.

having been prepared by polymerizing isoprene in the presence of a Ziegler-type catalyst.

To a solution of 300 g. of the above IR in 3l. of ben-

TABLE 2

| Sample | Reaction Conditions Acid anhydride Compound | PHR | BPO (PHR) | Modified IR COOH content | Physical Properties of Latex | | | |
|---|---|---|---|---|---|---|---|---|
| | | | | | Mechanical stability (wt. %) | Tensile strength of wet gel (kg/cm$^2$) | Tensile strength of dry film (kg/cm$^2$) | Toluene insolubles (wt. %) | Number average particle size ($\mu$) |
| A | Maleic anhydride | 1 | 0.05 | 0.22 | 0 | 6.0 | 10.0 | 86 | 0.7 |
| B | Citraconic anhydride | 2 | 0.05 | 0.12 | 0.5 | 2.4 | 3.6 | 45 | 2.1 |
| C | Itaconic anhydride | 1.5 | 0.04 | 0.19 | 0 | 3.0 | 6.0 | 69 | 0.9 |
| D | Maleic anhydride styrene | 1 0.5 | 0.05 | 0.19 | 0 | 5.5 | 8.8 | 79 | 1.15 |
| X-1 | Citraconic anhydride | 0.5 | 0.02 | 0.08 | 80 | 0.7 | 1.0 | 13 | 2.0 |
| X-2 | — | — | — | 0 | 30 | 0.7 | 1.0 | 10 | 0.65 |
| X-3 | — | — | — | 0 | 3.5 | 0.6 | 0.8 | 0-0.1 | 0.75 |

EXAMPLE 3

To the same benzene solution of IR as that utilized in Example 2, BPO and one of various carboxylating agents were added in the amounts indicated in Table 3. In nitrogen streams and under agitation, each mixture was heated at 100°C. for 2 hours. The reaction mixture was washed with water, followed by the addition of 1.5l. of a 1.5% aqueous solution of potassium oleate which had been previously adjusted to a pH of 11.0 with potassium hydroxide (amount of emulsifier: 8 PHR). The mixture was emulsified in a pipeline homomixer at 9000 r.p.m. for 2 minutes and the benzene was removed from the resultant emulsion by distillation under reduced pressure to obtain a dilute latex. This dilute latex was then centrifuged at 8000 r.p.m. to obtain a concentrated latex with a solids content of 60–66%. As indicated in Table 3, the thus obtained latex was found to have excellent properties.

zene, there were added dicumyl peroxide (abbreviated DICUP) and one of various unsaturated carboxylic acid esters in the amounts indicated in Table 4. After purging the air from the reaction vessel with nitrogen gas, each mixture was heated at 150°C. under agitation for 3 hours. To the reaction mixture thus obtained was directly added 1.5l. of water containing 7 PHR of potassium oleate and the mixture was then emulsified in a homomixer at 10000 r.p.m. for 5 minutes. From the resultant emulsion, the benzene was removed by steam distillation under reduced pressure to obtain a dilute latex. After the emulsification and during the stripping operation, potassium hydroxide was added to the emulsion in suitable amounts so that the pH of the dilute latex was 10 to 11.5. To this latex was added 0.3 PHR of ammonium alginate (as a creaming agent) and the composition was allowed to stand at room temperature for one week. From this creaming operation, there was obtained a concentrated latex having a solids content

TABLE 3

| Sample | Reaction Conditions Carboxylating agent Compound | PHR | BPO (PHR) | Modified IR COOH content | Properties of Latex | | | |
|---|---|---|---|---|---|---|---|---|
| | | | | | Mechanical stability (wt. %) | Tensile strength of wet gel (kg/cm$^2$) | Tensile strength of dry film (kg/cm$^2$) | Toluene insolubles (wt. %) | Number average particle size ($\mu$) |
| A | Acrylic acid | 5 | 0.04 | 0.58 | 0 | 2.1 | 3.0 | 15 | 0.65 |
| B | Maleic acid | 3 | 0.04 | 0.21 | 1.0 | 4.0 | 6.0 | 68 | 2.9 |
| C | Itaconic acid | 3 | 0.05 | 0.23 | 0 | 2.0 | 3.1 | 40 | 1.1 |
| D | Thioglycolic acid | 2 | 0.04 | 0.20 | 0 | 1.5 | 2.0 | 16 | 1.2 |
| E | Acrylic acid | 10 | 0.04 | 1.59 | 0 | 2.2 | 4.0 | 5 | 0.39 |

EXAMPLE 4

An IR having an intrinsic viscosity of 3.8 dl/g in toluene at 30° was employed as the starting IR, said IR of 60–65 weight percent. As will be seen from Table 4, this latex had improved wet gel strength and dry film strength as well as adequate stability notwithstanding the relatively high gel content of the rubber particles.

TABLE 4

| Sample | Reaction Conditions Carboxylating agent Compound | PHR | DICUP (PHR) | Modified IR COOH content | Properties of Latex | | | |
|---|---|---|---|---|---|---|---|---|
| | | | | | Mechanical stability (wt. %) | Tensile strength of wet gel (kg/cm$^2$) | Tensile strength of dry film (kg/cm$^2$) | Toluene insolubles (wt. %) | Number average particle size ($\mu$) |
| A | Diethyl maleate | 10 | 0.03 | 0.15 | 0 | 2.2 | 3.1 | 55 | 1.9 |
| B | Diethyl fumarate | 10 | 0.03 | 0.10 | 3.0 | 1.4 | 2.3 | 20 | 3.8 |
| C | Dimethyl | | | | | | | | |

TABLE 4-continued

| Sample | Reaction Conditions Carboxylating agent Compound | PHR | DICUP (PHR) | Modified IR COOH content | Mechanical stability (wt. %) | Properties of Latex Tensile strength of wet gel (kg/cm²) | Tensile strength of dry film (kg/cm²) | Toluene insolubles (wt. %) | Number average particle size (μ) |
|---|---|---|---|---|---|---|---|---|---|
| | itaconate | 10 | 0.03 | 0.14 | 0.2 | 1.8 | 2.7 | 45 | 2.5 |

EXAMPLE 5

To the same toluene solution of IR as that utilized in Example 1 (concentration: 10%) was added 0.04 PHR of BPO, together with one of the maleimides listed in Table 5 as a carboxylating agent at the indicated level. In nitrogen streams, the mixture was heated at 100°C. under agitation for 2 hours, after which the reaction mixture was directly emulsified with water containing 8 PHR of potassium oleate and concentrated in the same manner as in Example 2. The procedure provided a latex having a solids content of 63 to 65 weight percent. It is apparent from Table 5 that despite the relatively high gel content of the modified IR, the latex had satisfactory stability and improved wet gel strength and dry film strength.

TABLE 5

| Sample | Reaction Conditions Carboxylating agent Compound | PHR | BPO (PHR) | Modified IR COOH content | Mechanical stability (wt. %) | Properties of Latex Tensile strength of wet gel (kg/cm²) | Tensile strength of dry film (kg/cm²) | Toluene insolubles (wt. %) | Number average particle size (μ) |
|---|---|---|---|---|---|---|---|---|---|
| A | Maleimide | 1.5 | 0.04 | 0.12 | 1.2 | 3.0 | 4.4 | 30.5 | 1.1 |
| B | N-methyl Maleimide | 1.5 | 0.04 | 0.12 | 0.9 | 2.9 | 4.2 | 31 | 0.9 |
| C | Maleimide | 3 | 0.04 | 0.20 | 0 | 3.5 | 6.1 | 45 | 0.8 |
| D | N-methyl maleimide | 5 | 0.04 | 0.25 | 0 | 4.8 | 8.2 | 65 | 1.2 |

EXAMPLE 6

To the same solution of IR in benzene as used in Example 2 were added 0.05 PHR of BPO and 2 PHR of thioglycollic acid and, in an atmosphere of nitrogen gas, the mixture was heated at 100°C. for 2 hours under agitation. The reaction mixture was directly emulsified with water containing 8 PHR of potassium deate and then treated in the same manner as Example 2 to give a concentrated latex having a solids content of 65 weight percent. The carboxyl content of the modified IR was found to be 0.21 carboxyl group per 100 isoprene monomer units. The toluene-insolubles content of rubber in the latex particle was 15 weight percent and the number average particle size of the latex was 1.4μ.

The above latex displayed a mechanical stability value of 0.5 weight percent, a wet gel tensile strength of 2.5 kg/cm² and a dry film tensile strength of 3.5 kg/cm².

EXAMPLE 7

The same procedure as in Example 6 was followed, except 2 PHR of allylsuccinic acid anhydride was utilized in lieu of 2 PHR of thioglycollic acid, resulting in a concentrated latex having a solids content of 65 weight percent. The carboxyl content of the modified IR was 0.2 carboxyl group per 100 isoprene monomer units, the toluene-insolubles content of rubber in the latex particle was 70 weight percent and the number average particle size of the latex was 1.5μ.

The above latex showed a mechanical stability of 0%, and the tensile strength of the wet gel was 3.5 kg/cm².

The above examples and disclosure are set forth merely for illustrating the mode and the manner of the invention and, while various modifications and embodiments can be made by those skilled in the art, in the light of this invention, they are made without departing from the spirit of the invention. It is intended, therefore, that the invention be limited only by the scope of the claims which follow.

What is claimed is:

1. A polyisoprene rubber latex derived from synthetic cis-1,4-polyisoprene rubber and comprised of a stable aqueous dispersion of a modified polyisoprene rubber comprising of a carboxylated polyisoprene rubber with from about 0.03 to 20 carboxy groups per 100 recurring units of isoprene monomer in said cis-1,4-polyisoprene rubber said stable aqueous dispersion of modified polyisoprene rubber being obtained from an oil-in-water emulsion comprised of between about 4% to 20% by weight organic solvent solution of said modified polyisoprene rubber, an emulsifying agent and water after removal of said organic solvent from said emulsion.

2. The polyisoprene rubber latex as defined by claim 1, wherein the organic solvent of said organic solvent solution comprises an aliphatic, alicyclic or aromatic hydrocarbon.

3. The polyisoprene rubber latex as defined by claim 2, wherein said solvent is selected from the group consisting of benzene, toluene and xylene.

4. The polyisoprene rubber latex as defined by claim 1, wherein said synthetic cis-1,4-polyisoprene rubber has a cis-1,4- content between about 80% and 99%.

5. The polyisoprene rubber latex as defined by claim 1, wherein said carboxylated polyisoprene rubber is obtained by the reaction of polyisoprene rubber and a carboxylating agent selected from the group consisting of:

1. unsaturated mono- or polycarboxylic acids and their esters of the following formula:

-continued

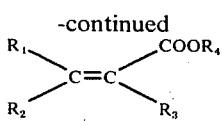

wherein $R_1$ and $R_2$ are the same or different and selected from the group consisting of H, $CH_3$, $C_2H_5$, $COOR_5$, $CH_2COOR_5$, CN, Cl and $CONH_2$; $R_3$ is H, $CH_3$, $C_2H_5$, $COOR_5$ or $CH_2COOR_5$; $R_4$ is H, $CH_3$, $C_2H_5$ or $C_3H_7$; and $R_5$ is H, $CH_3$, $C_2H_5$, $C_3H_7$, $C_4H_9$ or $C_6H_5$:

2. anhydrides of α-β-unsaturated dicarboxylic acids or α-β-unsaturated dicarboxylic acid monoamides of the following formulas:

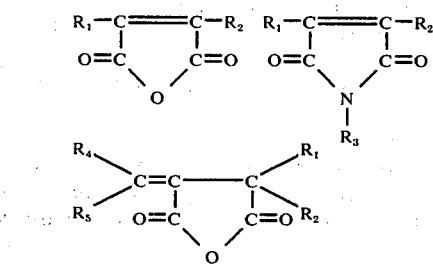

wherein $R_1$ and $R_2$ are the same or different and selected from the group consisting of H, $CH_3$, $C_2H_5$, Cl and CN; $R_3$ is H, $CH_3$, $CONH_2$ or $C_6H_5$; and $R_4$ and $R_5$ are the same or different and selected from the group consisting of H, $CH_3$ and $C_2H_5$;

3. α,β-unsaturated acid chlorides of the following formula:

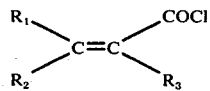

wherein $R_1$ and $R_2$ are the same or different and selected from the group consisting of H, $CH_3$, $C_2H_5$, $COOR_4$, $CH_2COOR_4$, CN, Cl, $CONH_2$ and COCl; $R_3$ is H, $CH_3$, $C_2H_5$ or $COOR_4$; $R_4$ is H, $CH_3$, $C_2H_5$, $C_3H_7$ or $C_6H_5$;

4. carboxyl-containing allyl compounds; and
5. a saturated carboxylic acid or ester compound capable of direct addition to said polyisoprene rubber; and
6. mixtures of said carboxylating agents.

6. The polyisoprene rubber latex as defined by claim 5, wherein said carboxylating agent is selected from the group consisting of acrylic acid, methacrylic acid, crotonic acid, maleic acid, tiglic acid, monomethyl maleate, dimethyl maleate, fumaric acid, monomethyl fumarate, dimethyl fumarate, itaconic acid, monomethyl itaconate, mesaconic acid, citraconic acid and maleic acid monoamide.

7. The polyisoprene rubber latex as defined by claim 5, wherein said carboxylating agent is selected from the group consisting of maleic anhydride, itaconic anhydride, citraconic anhydride, maleimide and N-methylmaleimide.

8. The polyisoprene rubber latex as defined in claim 5, wherein said carboxylating agent is selected from the group consisting of acrylic acid chloride, methacrylic acid chloride, maleic acid dichloride, itaconic acid chloride and crotonic acid chloride.

9. The polyisoprene rubber latex as defined by claim 5, wherein said carboxyl-containing allyl compound is allylsuccinic acid or anhydridge.

10. The polyisoprene rubber latex as defined by claim 5, wherein said saturated carboxylic acid or ester compound is selected from the group consisting of thioglycollic acid, thioglycollic acid ester, azodicarboxylic acid and azodicarboxylic acid ester.

11. The polyisoprene rubber latex as defined by claim 5, wherein said carboxylating agent is utilized in combination with a vinyl monomer selected from the group consisting of styrene, acrylamide and methyl methacrylate.

12. The polyisoprene rubber latex as defined by claim 5, wherein said carboxylating agent comprises maleic anhydride.

13. The polyisoprene rubber latex as defined by claim 1, wherein the volume ratio of said organic solvent solution of modified rubber to water in said oil-in-water emulsion is between about 3:1 and 1:10.

14. The polyisoprene rubber latex as defined by claim 13, wherein said volume ratio is between about 3:1 and 2:1.5.

15. The polyisoprene rubber latex as defined by claim 1, wherein the pH of said oil-in-water emulsion is between about 8 and 13.5.

16. The polyisoprene rubber latex as defined by claim 1, wherein the aqueous portion of said oil-in-water emulsion comprises water in admixture with an emulsifying agent comprising an anionic surfactant selected from the group consisting of the alkali metal or ammonium salts of oleic, abietic, palmitic, stearic, lauric, myristic, rosin and alkylbenzene sulfonic acids.

17. The polyisoprene rubber latex as defined by claim 16, wherein said anionic surfactant is utilized in combination with a nonionic surfactant.

18. The polyisoprene rubber latex as defined by claim 16, wherein said emulsifying agent is present in an amount ranging between about 2 to 20 parts by weight per 100 parts by weight of modified polyisoprene in said oil-in-water emulsion.

19. The polyisoprene rubber latex as defined by claim 1, wherein said stable aqueous dispersion of modified polyisoprene rubber is comprised of a mixture of modified polyisoprene rubber and unmodified polyisoprene rubber, said mixture containing up to about 80% by weight of unmodified polyisoprene rubber based upon the weight of said mixture.

20. The polyisoprene rubber latex as defined by claim 1, wherein the number average particle diameter of said latex is between about 0.2 and 5μ and the gel content of the modified polyisoprene rubber in the particles is at least 5% by weight and not in excess of the value calculated by the formula: $100 - 2.17$ (number average particle diameter $- 0.2)^2$.

21. The polyisoprene rubber latex as defined by claim 20, wherein said gel content is at least 15% by weight.

22. The polyisoprene rubber latex as defined by claim 1, wherein said latex after concentration has a solids content of 60% to 66%.

23. The polyisoprene rubber latex as defined by claim 1, wherein said latex has a mechanical stability of between 0.0% to 15% by weight, a wet get tensile strength of between 2.0 and 36.0 kg/cm² and a dry film tensile strength of between about 2.0 and 72.0 kg/cm².

24. The polyisoprene rubber latex as defined by claim 1, wherein said stable aqueous dispersion comprises, in addition to said modified polyisoprene rubber, rubber compounding ingredients.

25. The polyisoprene rubber latex as defined by claim 1, wherein the range of carboxyl groups in said carboxylated polyisoprene rubber is between 0.05 to 2 per 100 recurring units of isoprene monomer in said cis-1,4-polyisoprene rubber.

26. Shaped rubber articles obtained from the polyisoprene rubber latex defined by claim 1.

27. Shaped rubber articles derived from polyisoprene rubber latex defined in claim 1 in admixture with a latex derived from a rubber selected from the group consisting of natural rubber, unmodified polyisoprene, styrene-butadiene copolymer, acrylonitrile-butadiene copolymer, polybutadiene and chloroprene or a mixture thereof.

* * * * *